(12) United States Patent
Chen et al.

(10) Patent No.: US 8,531,962 B2
(45) Date of Patent: Sep. 10, 2013

(54) ASSIGNMENT OF ACK RESOURCE IN A WIRELESS COMMUNICATION SYSTEM

(75) Inventors: Wanshi Chen, San Diego, CA (US); Xiaoxia Zhang, San Diego, CA (US); Peter Gaal, San Diego, CA (US); Juan Montojo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 915 days.

(21) Appl. No.: 12/431,424

(22) Filed: Apr. 28, 2009

(65) Prior Publication Data

US 2009/0268685 A1   Oct. 29, 2009

Related U.S. Application Data

(60) Provisional application No. 61/048,911, filed on Apr. 29, 2008, provisional application No. 61/048,917, filed on Apr. 29, 2008, provisional application No. 61/049,835, filed on May 2, 2008.

(51) Int. Cl.
*G01R 31/08* (2006.01)

(52) U.S. Cl.
USPC .......................... 370/236; 370/329; 455/509

(58) Field of Classification Search
USPC ...... 370/236, 241, 329, 335, 395.4; 455/509; 718/104
See application file for complete search history.

(56) References Cited

U.S. PATENT DOCUMENTS

| | | | |
|---|---|---|---|
| 2003/0072266 A1* | 4/2003 | Uesugi et al. | 370/236 |
| 2004/0037224 A1 | 2/2004 | Choi et al. | |
| 2004/0179500 A1 | 9/2004 | Ozluturk | |
| 2006/0007934 A1* | 1/2006 | Chemiakina et al. | 370/395.4 |
| 2007/0271568 A1* | 11/2007 | Gorokhov | 718/104 |

(Continued)

FOREIGN PATENT DOCUMENTS

| | | |
|---|---|---|
| EP | 1811701 A2 | 7/2007 |
| KR | 100606099 81 | 7/2006 |
| RU | 2251219 C2 | 4/2005 |
| WO | 2009098869 A1 | 8/2009 |

OTHER PUBLICATIONS

3GPP: 3rd Generation Partnership Project. "Technical Specification Group Radio Access Network; Evolved Universal Terrestrial Radio Access (E-UTRA); Physical layer procedures (Release 8)." 3GPP TS 36.213 V8.2.0 (Mar. 2008). (pp. 1-30).

(Continued)

*Primary Examiner* — Jung Park
(74) *Attorney, Agent, or Firm* — Larry J Moskowitz

(57) ABSTRACT

Techniques for assigning acknowledgement (ACK) resource to a user equipment (UE) in a wireless communication system are described. In one design, a first parameter indicative of radio resources (e.g., the lowest index of at least one physical resource block) allocated to the UE for data transmission may be obtained. A second parameter indicative of another resource (e.g., a cyclic shift of a reference signal sequence) assigned to the UE for data transmission may also be obtained. The first and/or second parameter may be restricted, and each restricted parameter may be limited to a set of allowed values among all available values for the parameter. ACK resource assigned to the UE for data transmission may be determined based on the first and second parameters. In one design, sequential first parameter values may be mapped to sequential ACK resources indices. In another design, mirror mapping with different mapping directions may be used for different allowed values of the second parameter.

29 Claims, 10 Drawing Sheets

(56) References Cited

U.S. PATENT DOCUMENTS

| | | | | |
|---|---|---|---|---|
| 2008/0205348 | A1* | 8/2008 | Malladi | 370/335 |
| 2008/0311942 | A1* | 12/2008 | Kim et al. | 455/509 |
| 2009/0109906 | A1* | 4/2009 | Love et al. | 370/329 |

OTHER PUBLICATIONS

ETRI: "PHICH resource identification for extended CP" 3GPP Draft; R1-084142, 3rd Generation Partnership Project (3GPP), Mobile Competence Centre ; 650, Route Des Lucioles ; F-06921 Sophia-Antipolis Cedex ; France, no. Prague, Czech Republic; 20081110, Nov. 10, 2008, XP050317437. (pp. 1-8).

International Search Report and Written Opinion—PCT/US2009/042166, International Search Authority—European Patent Office—Sep. 14, 2009.

Nokia; Nokia Siemens Networks: "UL HARQ Operation and Timing" 3GPP Draft; CR to 36213 (R1-081677) TDD UL HARQ, 3rd Generation Partnership Project (3GPP), Mobile Competence Centre; 650, Route Des Lucioles; F-06921 Sophia-Antipolis Cedex ; France, vol. RAN WG1, no. Shenzhen, China; 20080331, Apr. 4, 2008, XP050109605. (pp. 1-3).

QUALCOMM Europe: "Mapping of PHICH Resources from PUSCH and DM-RS Transmission" 3GPP Draft; R1-081961, 3rd Generation Partnership Project (3GPP), Mobile Competence Centre; 650, Route Des Lucioles ; F-06921 Sophia-Antipolis Cedex ; France, vol. RAN WG1, no. Kansas City, USA; 20080505, Apr. 29, 2008, XP050110311. (pp. 1-7).

ZTE: "PHICH Resource Mapping in TDD" 3GPP Draft; R1-081410 PHICH Resource Mapping in TDD, 3rd Generation Partnership Project (3GPP), Mobile Competence Centre; 650, Route Des Lucioles; F-06921 Sophia-Antipolis Cedex; France, vol. RAN WG1, no. Shenzhen, China; 20080331, Mar. 26, 2008, XP050109827. (pp. 1-3).

Nokia, Nokia Siemens Networks: "PHICH and mapping to PHICH groups", 3GPP TSG-RAN WG1 Meeting #51bis, R1-080301, Seville, Spain, Jan. 14-18, 2008, pp. 1-5.

Panasonic: "Implicit assignment of PHICH", 3GPP TSG-RAN WG1 Meeting #51bis, R1-080135, Seville, Spain, Jan. 14-18, 2008, pp. 1-3.

3RD Generation Partnership Project (3GPP), 3rd Generation Partnership Project, Technical Specification Group Radio Access Network, Evolved Universal Terrestrial Radio Access (E-UTRA), Physical Channels and Modulation (Release 8) 3GPP Standard, 3GPP TS 36.211 V8.5.0, 1 Dec. 2008, pp. 1-82, XP050377537.

Taiwan Search Report—TW098114270—TIPO—Mar. 8, 2013.

* cited by examiner

Mapping $I_{PRB\_RA}^{lowest\_index}$ to PHICH Resources

$N_{RB}^{UL} = 25$, $N_g = 2$, $I_{adjacent\_1} = 1$

610  $n_{DMRS} = 0$
PHICH Group Index

| Orthogonal Sequence Index | 0 | 1 | 2 | 3 | 4 | 5 | 6 |
|---|---|---|---|---|---|---|---|
| 0 | 0 | 1 | 2 | 3 | 4 | 5 | 6 |
| 1 | 7 | 8 | 9 | 10 | 11 | 12 | 13 |
| 2 | 14 | 15 | 16 | 17 | 18 | 19 | 20 |
| 3 | 21 | 22 | 23 | 24 | | | |
| 4 | | | | | | | |
| 5 | | | | | | | |
| 6 | | | | | | | |
| 7 | | | | | | | |

620  $n_{DMRS} = 1$
PHICH Group Index

| Orthogonal Sequence Index | 0 | 1 | 2 | 3 | 4 | 5 | 6 |
|---|---|---|---|---|---|---|---|
| 0 | | | | | | | |
| 1 | | | | | | | |
| 2 | | | | | | | |
| 3 | | | | | | | |
| 4 | | | | 24 | 23 | 22 | 21 |
| 5 | 20 | 19 | 18 | 17 | 16 | 15 | 14 |
| 6 | 13 | 12 | 11 | 10 | 9 | 8 | 7 |
| 7 | 6 | 5 | 4 | 3 | 2 | 1 | 0 |

630  $n_{DMRS} = 2$
PHICH Group Index

| Orthogonal Sequence Index | 0 | 1 | 2 | 3 | 4 | 5 | 6 |
|---|---|---|---|---|---|---|---|
| 0 | | 0 | 1 | 2 | 3 | 4 | 5 |
| 1 | 6 | 7 | 8 | 9 | 10 | 11 | 12 |
| 2 | 13 | 14 | 15 | 16 | 17 | 18 | 19 |
| 3 | 20 | 21 | 22 | 23 | 24 | | |
| 4 | | | | | | | |
| 5 | | | | | | | |
| 6 | | | | | | | |
| 7 | | | | | | | |

640  $n_{DMRS} = 3$
PHICH Group Index

| Orthogonal Sequence Index | 0 | 1 | 2 | 3 | 4 | 5 | 6 |
|---|---|---|---|---|---|---|---|
| 0 | | | | | | | |
| 1 | | | | | | | |
| 2 | | | | | | | |
| 3 | | | | | | | |
| 4 | | | 24 | 23 | 22 | 21 | 20 |
| 5 | 19 | 18 | 17 | 16 | 15 | 14 | 13 |
| 6 | 12 | 11 | 10 | 9 | 8 | 7 | 6 |
| 7 | 5 | 4 | 3 | 2 | 1 | 0 | |

*FIG. 6*

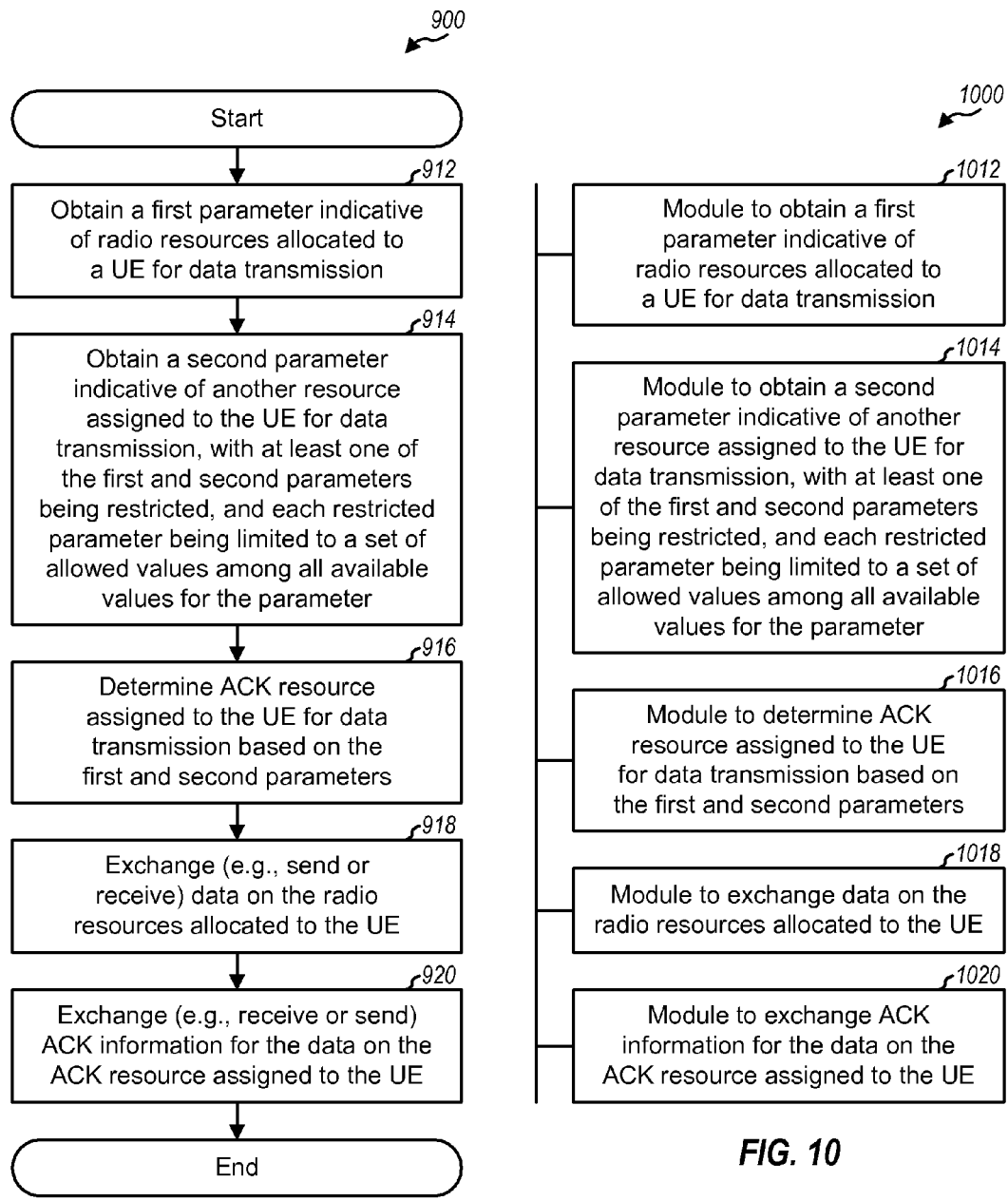

ASSIGNMENT OF ACK RESOURCE IN A WIRELESS COMMUNICATION SYSTEM

The present application claims priority to provisional U.S. Application Ser. No. 61/048,911, entitled "A METHOD AND APPARATUS OF MAPPING PHICH RESOURCES," filed Apr. 29, 2008, provisional U.S. Application Ser. No. 61/048,917, entitled "A METHOD AND APPARATUS OF MAPPING PHICH RESOURCES," filed Apr. 29, 2008, and provisional U.S. Application Ser. No. 61/049,835, entitled "A METHOD AND APPARATUS OF MAPPING PHICH RESOURCES," filed May 2, 2008, all assigned to the assignee hereof and incorporated herein by reference.

BACKGROUND

I. Field

The present disclosure relates generally to communication, and more specifically to techniques for assigning resources in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include a number of base stations that can support communication for a number of user equipments (UEs). A base station may communicate with a UE on the downlink and uplink. The downlink (or forward link) refers to the communication link from the base station to the UE, and the uplink (or reverse link) refers to the communication link from the UE to the base station. The UE may send a transmission of data to the base station. The base station may decode the transmission of data and may send acknowledgement (ACK) information to the UE. The ACK information may indicate whether the transmission of data was decoded correctly or in error by the base station. The UE may determine whether to send a retransmission of data or a new transmission of data based on the ACK information. It may be desirable to efficiently assign ACK resource for sending the ACK information.

SUMMARY

Techniques for assigning ACK resource to a UE in a wireless communication system are described herein. To avoid signaling overhead, an ACK resource allocation may be implicitly conveyed by parameters sent in an uplink grant. The amount of ACK resources available for allocation to UEs may be limited. The mapping of the parameters in the uplink grant to ACK resources may be designed to avoid or reduce collisions, so that multiple UEs are not assigned the same ACK resource.

In one design, a first parameter indicative of radio resources allocated to a UE for data transmission may be obtained. The first parameter may comprise the lowest/starting index of at least one physical resource block (PRB) allocated to the UE for data transmission. A second parameter indicative of another resource assigned to the UE for data transmission may also be obtained. The second parameter may comprise a cyclic shift of a reference signal sequence assigned to the UE for data transmission. The first parameter and/or the second parameter may be restricted, and each restricted parameter may be limited to a set of allowed values among all available values for the parameter. The set of allowed values may be selected to avoid collisions in mapping the first and second parameters to the available ACK resources.

ACK resource assigned to the UE for data transmission may be determined based on the first and second parameters. In one design, sequential values of the first parameter may be mapped to sequential indices of the available ACK resources, with each allowed value of the second parameter being associated with a different starting ACK resource index. In another design, different mapping directions may be used for different allowed values of the second parameter. For a first allowed value of the second parameter, sequentially increasing values of the first parameter may be mapped to sequentially increasing indices of the available ACK resources, e.g., starting with the smallest ACK resource index. For a second allowed value of the second parameter, sequentially increasing values of the first parameter may be mapped to sequentially decreasing indices of the available ACK resources, e.g., starting with the largest ACK resource index. The first parameter values may also be mapped to the available ACK resources in other manners.

In one design, a third parameter indicative of the minimum amount of radio resources to allocate to the UE may be obtained. The third parameter may be determined based on the amount of available ACK resources, the amount of available radio resources, the number of UEs being multiplexed together with spatial division multiple access (SDMA), etc. The third parameter may be selected to avoid collisions in mapping the first and second parameters to the available ACK resources. The ACK resource may then be determined based further on the third parameter.

Various aspects and features of the disclosure are described in further detail below.

BRIEF DESCRIPTION OF THE DRAWINGS

FIG. 6 shows another example of collision-free ACK resource mapping.

FIG. 9 shows a process for determining ACK resource for a UE.

FIG. 10 shows an apparatus for determining ACK resource for a UE.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the systems and radio technologies mentioned above as well as other systems and radio technologies. For clarity, certain aspects of the techniques are described below for LTE, and LTE terminology is used in much of the description below.

The techniques described herein may also be used for data transmission on the uplink as well as the downlink. For clarity, certain aspects of the techniques are described below for data transmission on the uplink.

Figure 1:
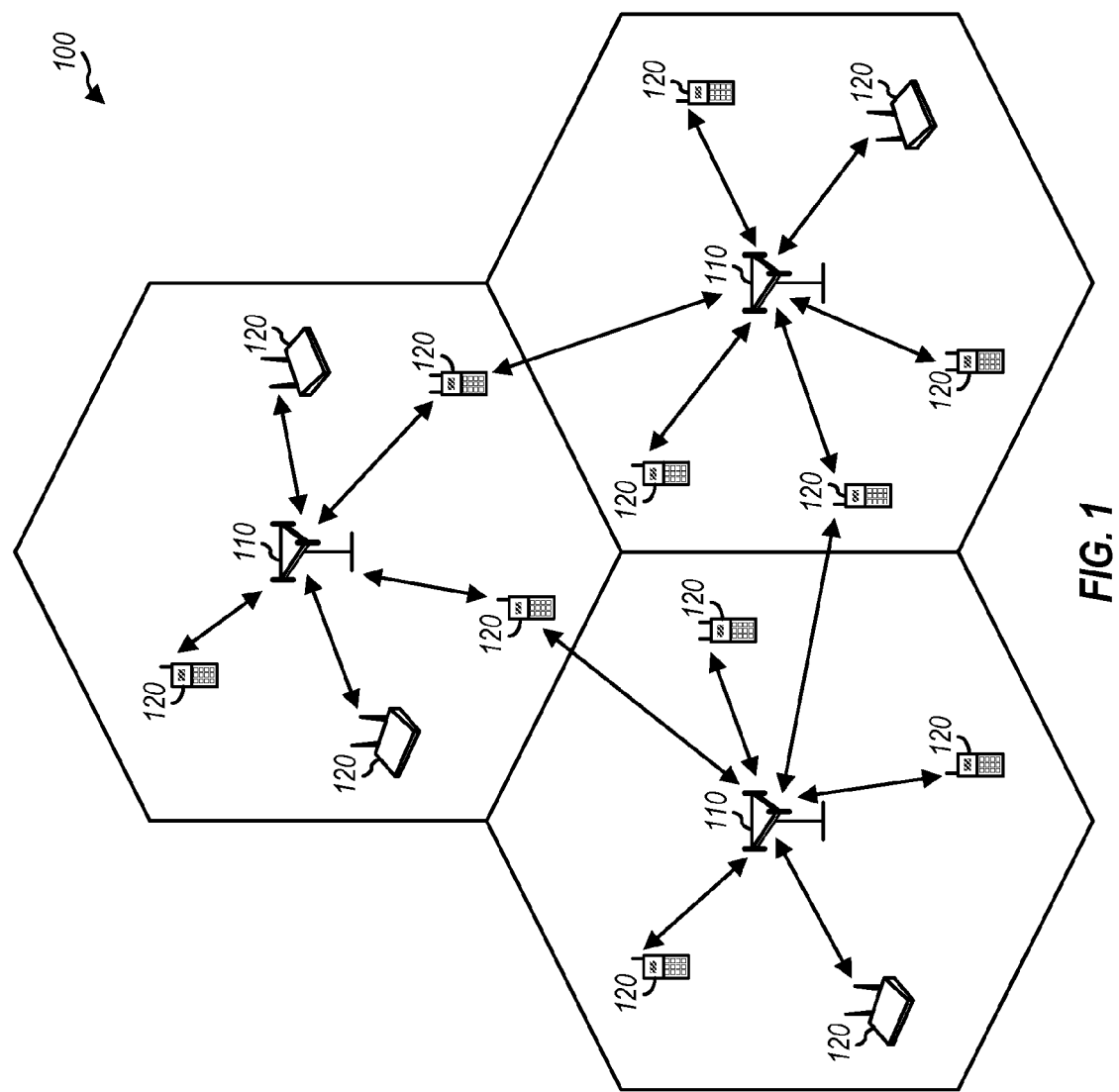
FIG. 1 shows a wireless communication system.

FIG. 1 shows a wireless communication system 100, which may be an LTE system. System 100 may include a number of evolved Node Bs (eNB) 110 and other network entities. An eNB may be a station that communicates with the UEs and may also be referred to as a Node B, a base station, an access point, etc. UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc.

The system may support data transmission with hybrid automatic retransmission (HARQ). For HARQ on the uplink, a UE may send a transmission of data and may send one or more additional transmissions of the data, if needed, until the data is decoded correctly by an eNB, or the maximum number of transmissions has been sent, or some other termination condition is encountered.

The system may also support SDMA. For SDMA on the uplink, multiple UEs may simultaneously send data to an eNB on shared radio resources. The eNB may perform receiver spatial processing to recover the data sent simultaneously by the multiple UEs.

Figure 2:
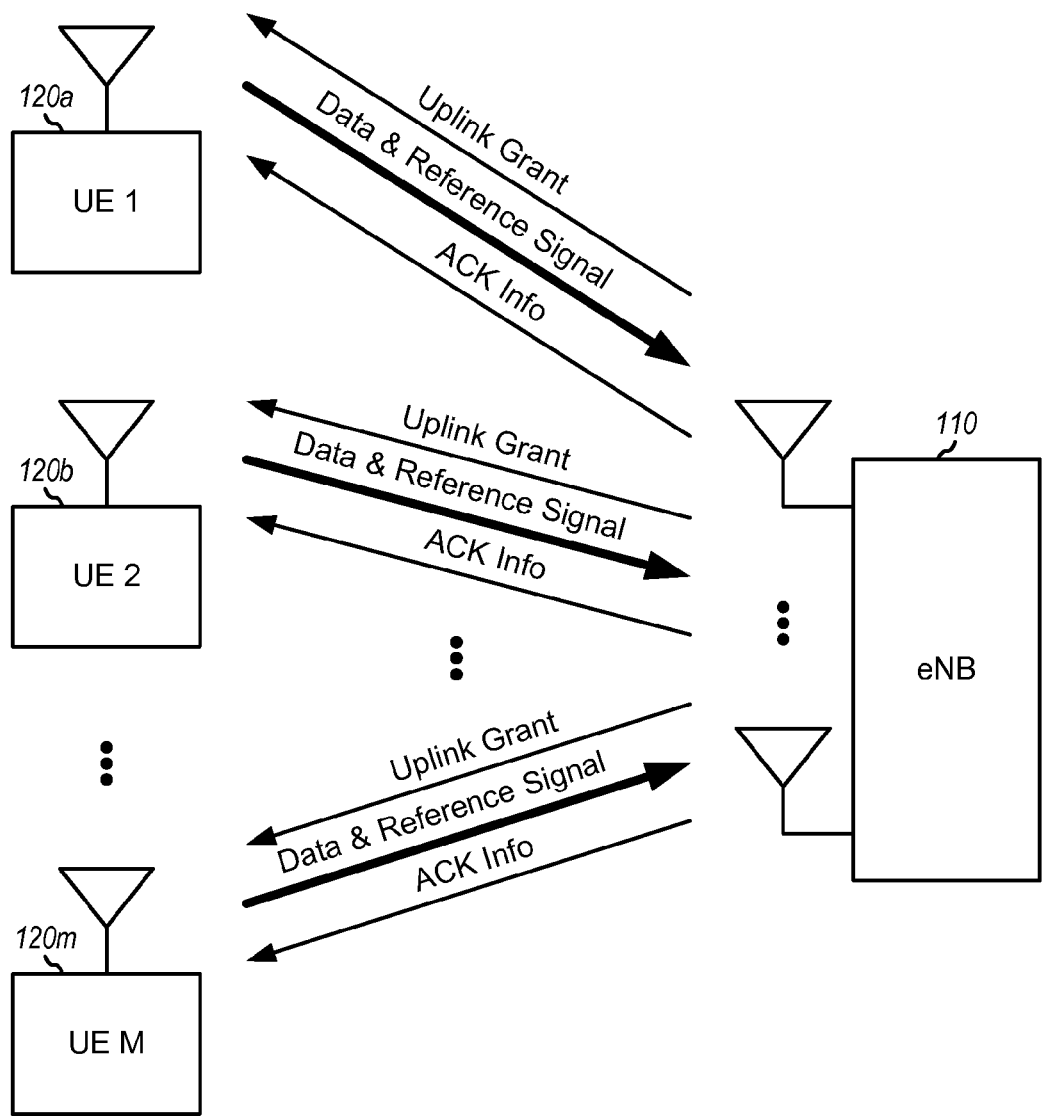
FIG. 2 shows an example of data transmission on the uplink.

FIG. 2 shows an example of data transmission on the uplink with SDMA. An eNB 110 may schedule M UEs 120a through 120m for uplink data transmission, where M=1 for no SDMA, M=2 for 2-way SDMA, M=4 for 4-way SDMA, and M>1 for M-way SDMA. The eNB may assign resources to each scheduled UE and may send an uplink grant to the UE. The uplink grant for each UE may explicitly or implicitly convey (i) resources for sending data on the uplink, (ii) a cyclic shift to use for a demodulation reference signal (DMRS), (iii) resources for sending ACK information on the downlink, and/or (iv) other information. A demodulation reference signal may be referred to as pilot and may be used for channel estimation. Each scheduled UE may send data and a demodulation reference signal in accordance with its uplink grant to the eNB. The eNB may derive a channel estimate for each UE based on the demodulation reference signal sent by that UE and may perform receiver spatial processing for all M UEs based on their channel estimates. The eNB may also determine whether the data for each UE has been decoded correctly and may send ACK information to the UE.

In LTE, the transmission timeline for each link may be partitioned into units of subframes. Each subframe may have a particular duration, e.g., one millisecond (ms), and may be partitioned into two slots. Each slot may include six symbol periods for an extended cyclic prefix or seven symbol periods for a normal cyclic prefix.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 MHz, respectively.

$N_{RB}^{UL}$ physical resource blocks (PRBs) with indices of 0 to $N_{RB}^{UL}-1$ may be available for the uplink, and $N_{RB}^{DL}$ PRBs may be available for the downlink. Each PRB may cover $N_{SC}$ subcarriers (e.g., $N_{SC}=12$ subcarriers) in one slot. The number of PRBs in each slot for each link may be dependent on the system bandwidth and may range from 6 to 110 for system bandwidth of 1.25 to 20 MHz.

A UE may be assigned one or more consecutive PRBs for data transmission on the uplink. An uplink resource allocation (RA) for the UE may be conveyed by the lowest index of all assigned PRBs, which may be denoted as $I_{PRB\_RA}^{lowest\_index}$, and the number of assigned PRBs. A lowest PRB index may also be referred to as a starting PRB index. The UE may also be assigned a cyclic shift index for the demodulation reference signal, which may be denoted as $n_{DMRS}$. The UE may also be assigned resources for receiving ACK information sent on a physical HARQ indicator channel (PHICH). Resources for sending ACK information may be referred to as ACK resource, PHICH resource, etc.

Figure 3:
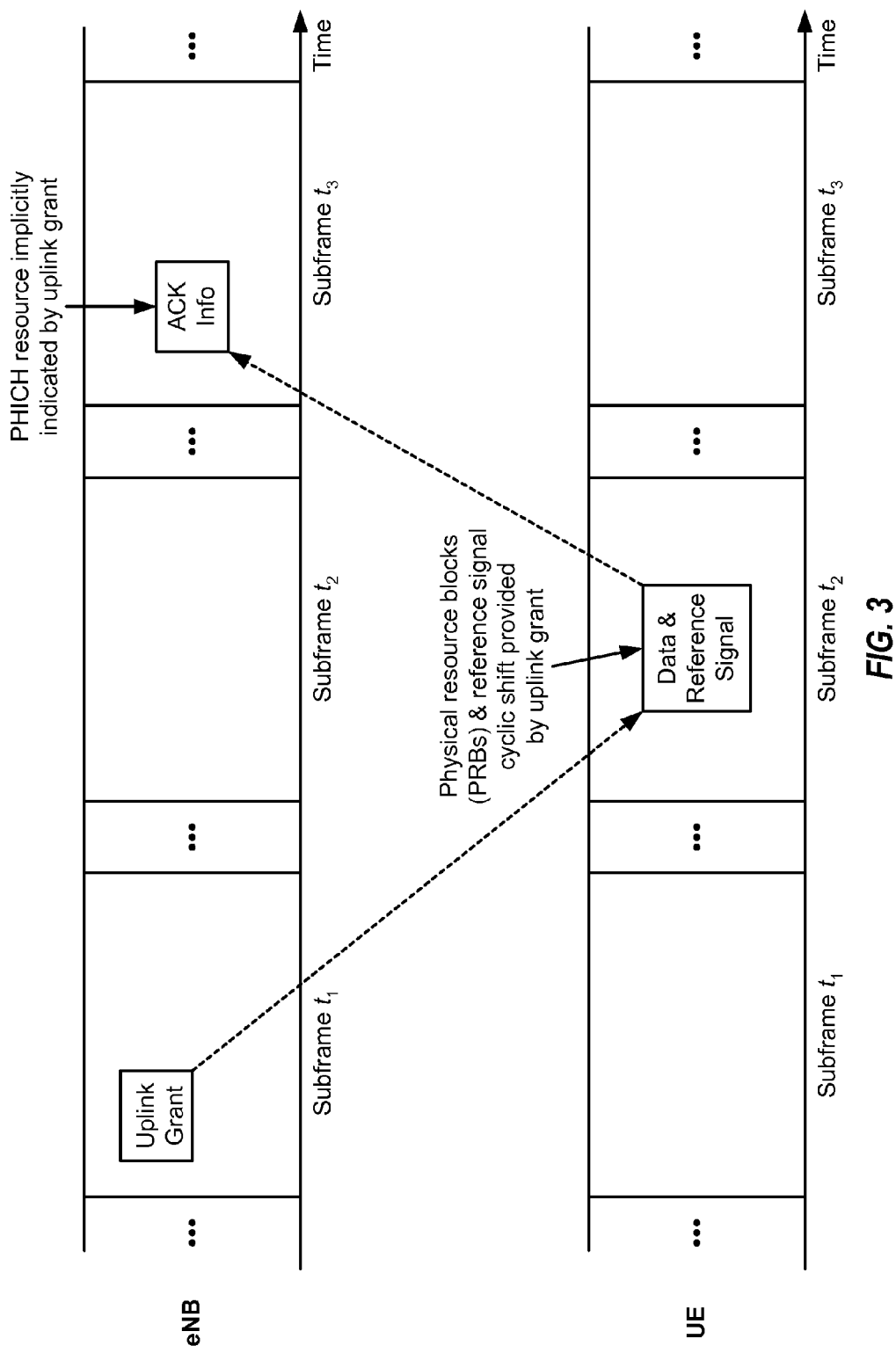
FIG. 3 shows a timing diagram for data transmission on the uplink.

FIG. 3 shows an exemplary timing diagram for data transmission on the uplink. An eNB may receive a scheduling request from a UE, schedule the UE for data transmission on the uplink, and assign resources (e.g., PRBs and DMRS cyclic shift) to the UE. The eNB may send an uplink grant for the UE on a physical downlink control channel (PDCCH) in subframe $t_1$. The UE may receive the uplink grant from the eNB and may send data and a demodulation reference signal in accordance with the uplink grant on a physical uplink shared channel (PUSCH) in subframe $t_2$. The eNB may process the uplink transmission from the UE and may determine whether the data was decoded correctly or in error. The eNB may send ACK information for the UE on the PHICH in subframe $t_3$. Subframe $t_2$ may be offset from subframe $t_1$ by a first subframe offset, and subframe $t_3$ may be offset from subframe $t_2$ by a second subframe offset.

The PRBs and DMRS cyclic shift assigned to the UE for uplink transmission may be explicitly conveyed by the uplink grant. To reduce signaling overhead, the PHICH resource may be implicitly conveyed by the uplink grant.

In an aspect, a PHICH resource allocation may be implicitly conveyed by the lowest PRB index $I_{PRB\_RA}^{lowest\_index}$ of an uplink resource allocation and a DMRS cyclic shift $n_{DMRS}$, both of which may be signaled in an uplink grant. The amount of PHICH resources available for allocation to UEs may be limited in order to reduce overhead. The mapping of $I_{PRB\_RA}^{lowest\_index}$ and $n_{DMRS}$ to the available PHICH resources may be designed to avoid or reduce collisions on the PHICH. A collision may occur when multiple UEs with different assignments of $I_{PRB\_RA}^{lowest\_index}$ and $n_{DMRS}$ are mapped to the same PHICH resource, and their ACK information would collide on the PHICH resource.

A demodulation reference signal for the PUSCH may be generated based on a demodulation reference signal sequence, which may be expressed as:

$$r^{PUSCH}(n) = e^{j\alpha n} \cdot \bar{r}_{u,v}(n), \text{ for } n=0, \ldots, N_{RS}-1, \quad \text{Eq (1)}$$

where $\bar{r}_{u,v}(n)$ is a base sequence, which is the v-th base sequence in the u-th group, α is a cyclic shift for the demodulation reference signal, and $r^{PUSCH}(n)$ is the demodulation reference signal sequence of length $N_{RS}$.

The base sequence may be a pseudo-random sequence, a Zadoff-Chu sequence, or some other sequence having good correlation properties. The cyclic shift α may be obtained from the DMRS cyclic shift $n_{DMRS}$, as follows:

$$\alpha = \frac{2\pi \cdot [(n_{DMRS} + n_{offset}) \bmod 12]}{12}, \quad \text{Eq (2)}$$

where $n_{offset}$ may include other parameters and "mod" denotes a modulo operation.

Table 1 shows a set of eight $n_{DMRS}$ values in accordance with one exemplary design. Table 1 also gives a 3-bit signaled value for each supported $n_{DMRS}$ value as well as the corresponding α value, assuming $n_{offset}=0$. Other sets of $n_{DMRS}$ values may also be used in other designs.

TABLE 1

| Signaled value | $n_{DMRS}$ | α |
|---|---|---|
| 0 | 0 | 0 |
| 1 | 2 | π/3 |
| 2 | 3 | π/2 |
| 3 | 4 | 2π/3 |
| 4 | 6 | π |
| 5 | 8 | 4π/3 |
| 6 | 9 | 3π/2 |
| 7 | 10 | 5π/3 |

A configurable amount of PHICH resources may be reserved for sending ACK information to UEs on the downlink. PHICH resources may be reserved in unit of PHICH groups. The number of PHICH groups to reserve, $N_{PHICH}^{group}$, may be given as:

$$N_{PHICH}^{group} = \begin{cases} \lceil N_g \cdot N_{RB}^{DL}/8 \rceil & \text{for normal cyclic prefix} \\ 2 \cdot \lceil N_g \cdot N_{RB}^{DL}/8 \rceil & \text{for extended cyclic prefix} \end{cases} \quad \text{Eq (3)}$$

where $N_g$ is a configurable parameter, and "⌈x⌉" denotes a ceiling operator that provides the smallest integer value that is equal to or less than x.

Table 2 gives the number of PHICH groups versus $N_g$ for some typical system bandwidths.

TABLE 2

Number of PHICH groups versus $N_g$

| System Bandwidth ($N_{RB}^{UL}$) | $N_g = 1/6$ | $N_g = 1/2$ | $N_g = 1$ | $N_g = 2$ |
|---|---|---|---|---|
| 6 | 1 | 1 | 1 | 2 |
| 25 | 1 | 2 | 4 | 1 |
| 50 | 2 | 4 | 7 | 13 |
| 100 | 3 | 7 | 13 | 25 |

Each PHICH group may include $N_{PHICH}^{seq}$ PHICH resources that may be associated with $N_{PHICH}^{seq}$ orthogonal sequences. Each PHICH resource may correspond to one orthogonal sequence in one PHICH resource group. The total number of PHICH resources, $N_{PHICH}$, may then be given as:

$$N_{PHICH} = N_{PHICH}^{group} \cdot N_{PHICH}^{seq} = 2 N_{SF}^{PHICH} \cdot N_{PHICH}^{group}, \quad \text{Eq (4)}$$

where $N_{SF}^{PHICH}$ is the length of the orthogonal sequences for the PHICH. $N_{SF}^{PHICH}=4$ for the normal cyclic prefix, and $N_{SF}^{PHICH}=2$ for the extended cyclic prefix. Since $N_{PHICH}^{seq}=2N_{SF}^{PHICH}$, each PHICH group may include eight PHICH resources for the normal cyclic prefix or four PHICH resources for the extended cyclic prefix.

A UE may be assigned a PHICH resource. In one exemplary design, the assigned PHICH resource may be identified by an index pair $(n_{PHICH}^{group}, n_{PHICH}^{seq})$ defined as follows:

$$n_{PHICH}^{group} = (I_{PRB\_RA}^{lowest\_index} + n_{DMRS}) \bmod N_{PHICH}^{group}, \text{ and} \quad \text{Eq (5a)}$$

$$n_{PHICH}^{seq} = (\lfloor I_{PRB\_RA}^{lowest\_index}/N_{PHICH}^{group} \rfloor + n_{DMRS}) \bmod N_{PHICH}^{seq}, \quad \text{Eq (5b)}$$

where $n_{PHICH}^{group}$ is an index of a PHICH group for the assigned PHICH resource, and $n_{PHICH}^{seq}$ is an index of an orthogonal sequence for the assigned PHICH resource.

The assigned PHICH resource may also be defined by other equations in other designs.

For the design shown in Table 1, $n_{DMRS}$ may have one of eight possible values, or $n_{DMRS} \in \{0, 2, 3, 4, 6, 8, 9, 10\}$. $I_{PRB\_RA}^{lowest\_index}$ may have one of $N_{RB}^{UL}$ values if a UE can be assigned any one of the available PRBs. If $I_{PRB\_RA}^{lowest\_index}$ and $n_{DMRS}$ are used directly to compute $n_{PHICH}^{group}$ and $n_{PHICH}^{seq}$ as shown in equation set (5), then the inputs $I_{PRB\_RA}^{lowest\_index}$ and $n_{DMRS}$ will have a higher dimensional space than that of the outputs $n_{PHICH}^{group}$ and $n_{PHICH}^{seq}$. In particular, the input dimensional space may be roughly $8N_{RB}^{UL}$ whereas the output dimensional space may be $2N_{RB}^{UL}$ or less, depending on the value of $N_g$. Thus, the PHICH resource mapping given by equation set (5) is subject to collisions, which would result in multiple UEs being assigned the same PHICH resource.

Collisions on the PHICH may be avoided by carefully assigning $I_{PRB\_RA}^{lowest\_index}$ and $n_{DMRS}$ to UEs such that no two UEs are mapped to the same PHICH resource. However, restricting assignments of $I_{PRB\_RA}^{lowest\_index}$ and $n_{DMRS}$ to only certain combinations that would not result in collisions may greatly increase the complexity of a scheduler for the uplink. The operation of the scheduler may be simplified if PHICH collisions can be avoided by the design of the PHICH resource mapping.

In general, collision-free PHICH resource mapping may be achieved if the total number of UEs, $N_{UE}$, to schedule in any given subframe is limited as follows:

$$N_{UE} \leq N_{PHICH}. \quad \text{Eq (6)}$$

Equation (6) assumes that each UE may be assigned one PHICH resource. Equation (6) may apply regardless of whether or not SDMA is used for the scheduled UEs. $N_{UE}$ denotes the size of the input dimensional space, and $N_{PHICH}$ denotes the size of the output dimensional space.

Collisions in the PHICH resource mapping may be mitigated by reducing the degree of freedom of the inputs to the mapping. In general, the degree of freedom of $I_{PRB\_RA}^{lowest\_index}$ and/or $n_{DMRS}$ may be reduced in order to reduce the input dimensional space and hence mitigate collisions. The amount of reduction in the freedom of $I_{PRB\_RA}^{lowest\_index}$ and/or $n_{DMRS}$ may be configurable and may be dependent on the output dimensional wet index space. Maximizing the freedom of $I_{PRB\_RA}^{lowest\_index}$ and/or $n_{DMRS}$ to the extent possible while mitigating collisions may provide the scheduler with the most flexibility in assigning resources to UEs.

$n_{DMRS}$ may be limited in order to reduce the input dimensional space. In one design, $n_{DMRS}$ may be limited as follows:

$n_{DMRS}=0$ for non-SDMA transmission from one UE, $n_{DMRS} \in \{0, 1\}$ for 2-way SDMA transmissions from two UEs, $n_{DMRS} \in \{0, 1, 2\}$ for 3-way SDMA transmissions from three UEs, and $n_{DMRS} \in \{0, 1, 2, 3\}$ for 4-way SDMA transmissions from four UEs.

In general, $n_{DMRS}$ may be restricted to a range of 0 to M−1 for M-way SDMA, where $M \geq 1$. The input dimensional space may be reduced correspondingly.

In one design, a UE may be provided with a parameter $l_{adjacent\_M}$, which may indicate the minimum resource allocation size (in number of PRBs) for the UE. $l_{adjacent\_M}$ may be dependent on the output dimensional space, which may in turn be dependent on $N_g$, as shown in Table 2. In one design, the minimum resource allocation size may be defined as shown in Table 3. For the case when $N_g=2$, a minimize resource allocation size of 1 (i.e., no allocation restriction) may be achievable for non-SDMA UEs and 2-way SDMA UEs. $l_{adjacent\_M}$ may restrict the number of PRBs to allocate to a UE but does not restrict the starting PRB for the UE. For example, the UE may have $l_{adjacent\_M}=4$ and may be allocated a minimum of four PRBs starting with any PRB from 0 to $N_{RB}^{UL}-4$.

TABLE 3

Minimum resource allocation size $l_{adjacent\_M}$ versus $N_g$

| | $N_g \leq 1$ | $N_g = 2$ |
|---|---|---|
| Non-SDMA UEs | $l_{adjacent\_1} \geq 1$ (see Table 4) | $l_{adjacent\_1} = 1$ |
| M-way SDMA UEs, for M > 1 | $l_{adjacent\_M} = M \cdot l_{adjacent\_1}$ | $l_{adjacent\_M} = \lceil M/2 \rceil$ |

$l_{adjacent\_M}$ may also be defined in other manners to avoid or reduce collisions on the PHICH. For example, $l_{adjacent\_M}$ may be defined as $l_{adjacent\_M}=M/N_g$. $N_g$ may be broadcast to the UEs and may be common for all UEs. M may be dependent on the uplink grant and may be different for different UEs scheduled in a given subframe. For a given UE, M may change over time and may be implicitly determined based on $n_{DMRS}$. In any case, a UE may be allocated at least $l_{adjacent\_M}$ consecutive PRBs by the scheduler.

For a given system bandwidth of $N_{RB}^{UL}$ PRBs and a minimum resource allocation size of $l_{adjacent\_1}$, the total number of UEs that can be scheduled in any given subframe may be upper bounded as follows:

$$N_{UE} \leq \frac{N_{RB}^{UL}}{l_{adjacent\_1}}. \qquad \text{Eq (7)}$$

The minimum resource allocation size $l_{adjacent\_1}$ may be determined from equations (4), (6) and (7) and may be expressed as:

$$l_{adjacent\_1} = \left\lceil \frac{N_{RB}^{UL}}{N_{PHICH}} \right\rceil. \qquad \text{Eq (8)}$$

Collision-free PHICH resource mapping may be achieved with $l_{adjacent\_1}$ defined as shown in equation (8). Table 4 gives the minimum resource allocation size $l_{adjacent\_1}$ versus $N_g$ for some typical system bandwidths. Table 4 indicates that $l_{adjacent\_1}$ increases as $N_g$ decreases, as expected. There is no resource allocation restriction for non-SDMA UEs when $l_{adjacent\_1}=1$. M-way SDMA UEs may be allocated a minimize of $M \cdot l_{adjacent\_1}$ or $\lceil M/2 \rceil$ consecutive PRBs, depending on the configured $N_g$.

TABLE 4

Minimum resource allocation size $l_{adjacent\_1}$ versus $N_g$

| System Bandwidth ($N_{RB}^{UL}$) | $N_g = 1/6$ | $N_g = 1/2$ | $N_g = 1$ | $N_g = 2$ |
|---|---|---|---|---|
| 7 | 1 | 1 | 1 | 1 |
| 25 | 4 | 2 | 1 | 1 |
| 50 | 4 | 2 | 1 | 1 |
| 100 | 5 | 2 | 1 | 1 |

In one design, a collision-free PHICH resource mapping may be defined as follows:

$$n_{PHICH}^{group} = I_{PRB}^{adjusted} \bmod N_{PHICH}^{group}, \text{ and} \qquad \text{Eq (9a)}$$

$$n_{PHICH}^{seq} = \lfloor I_{PRB}^{adjusted}/N_{PHICH}^{group} \rfloor \bmod N_{PHICH}^{seq}, \qquad \text{Eq (9b)}$$

where $I_{PRB}^{adjusted}$ is an adjusted PRB index or intermediate index. $I_{PRB}^{adjusted}$ may be defined in various manners based on $I_{PRB\_RA}^{lowest\_index}$, $n_{DMRS}$, $l_{adjacent\_M}$ and/or other parameters. $I_{PRB}^{adjusted}$ may be defined such that unique values of $I_{PRB}^{adjusted}$ are mapped to different PHICH resources to avoid collisions.

In one design, for $N_g \leq 1$, $I_{PRB}^{adjusted}$ may be defined as follows:

$$I_{PRB}^{adjusted} = \lfloor I_{PRB\_RA}^{lowest\_index}/l_{adjacent\_1} \rfloor + n_{DMRS}. \qquad \text{Eq (10)}$$

For the design shown in equation (10), non-SDMA UEs may be assigned progressively higher $I_{PRB\_RA}^{lowest\_index}$ values that may be mapped to progressively higher $I_{PRB}^{adjusted}$ values. M-way SDMA UEs with the same $n_{DMRS}$ value may be mapped to consecutive $I_{PRB}^{adjusted}$ values due to different $n_{DMRS}$ values for these UEs.

In one design, for $N_g=2$, $I_{PRB}^{adjusted}$ may be defined as follows:

$$I_{PRB}^{adjusted} = \begin{cases} I_{PRB\_RA}^{lowest\_index} + \lfloor n_{DMRS}/2 \rfloor & \text{if } n_{DMRS} \text{ is even} \\ N_{PHICH}^{group} \cdot N_{PHICH}^{seq} - 1 - I_{PRB\_RA}^{lowest\_index} - \lfloor n_{DMRS}/2 \rfloor & \text{if } n_{DMRS} \text{ is odd.} \end{cases} \quad \text{Eq (11)}$$

The design shown in equation (11) employs a mirror-mapping rule. The top part of equation (11) is applicable for even $n_{DMRS}$ values. For the top part, $I_{PRB}^{adjusted} = I_{PRB\_RA}^{lowest\_index} + \lfloor n_{DMRS}/2 \rfloor$, and sequentially increasing lowest PRB indices are mapped to sequentially increasing $I_{PRB\_RA}^{lowest\_index}$ values. M-way SDMA UEs with the same lowest PRB index may be mapped to consecutive $I_{PRB}^{adjusted}$ values due to different $n_{DMRS}$ values for these UEs. The bottom part of equation (11) is applicable for odd $n_{DMRS}$ values. For the bottom part, $I_{PRB\_RA}^{adjusted} = I_{max} - I_{PRB\_RA}^{lowest\_index} - \lfloor n_{DMRS}/2 \rfloor$, where $I_{max} = N_{PHICH}^{group} \cdot N_{PHICH}^{seq} - 1$ is the largest PHICH resource index. Sequentially increasing lowest PRB indices are then mapped to sequentially decreasing $I_{PRB}^{adjusted}$ values, starting with the largest PHICH resource index. The bottom part of equation (11) thus maps lowest PRB indices to PHICH resources in the opposite manner as the top part of equation (11).

In another design, $I_{PRB}^{adjusted}$ may be defined as follows:

$$I_{PRB}^{adjusted} = \lfloor I_{PRB\_RA}^{lowest\_index} / l_{adjacent\_1} \rfloor + I_{offset}, \quad \text{Eq (12)}$$

where $I_{offset}$ is an index offset.

In yet another design, $I_{PRB}^{adjusted}$ may be defined as follows:

$$I_{PRB}^{adjusted} = \begin{cases} I_{PRB\_RA}^{lowest\_index} + I_{offset} & \text{for a first set of } n_{DMRS} \text{ values} \\ I_{max} - I_{PRB\_RA}^{lowest\_index} - I_{offset} & \text{for a second set of } n_{DMRS} \text{ values.} \end{cases} \quad \text{Eq (13)}$$

The design shown in equation (13) also employs a mirror-mapping rule.

$I_{offset}$ in equations (12) and (13) may be defined in various manners to map M-way SDMA UEs with the same lowest PRB index to different $I_{PRB}^{adjusted}$ values. In one design, $I_{offset}$ may be equal to $\lfloor n_{DMRS}/2 \rfloor$ when $N_g=2$, as shown in equation (11). In another design, $I_{offset}$ when $N_g=1$ may be defined as follows:

$$I_{offset} = (n_{DMRS} \bmod l_{adjacent\_1}) + N_{PHICH}^{group} \left\lfloor \frac{n_{DMRS}}{l_{adjacent\_1}} \right\rfloor. \quad \text{Eq (14)}$$

$I_{offset}$ may also be defined in other manners based on $n_{DMRS}$, $l_{adjacent\_1}$, and/or other parameters such as $N_g$, $N_{RB}^{UL}$, etc.

The collision-free PHICH resource mapping in equations (9) to (11) has several key features. First, collision-free mapping of UEs to PHICH resources may be achieved while minimizing, to the extent possible, restrictions on resource allocation for uplink scheduling. Second, by restricting the number of assigned PRBs to at least $l_{adjacent\_M}$ for M-way SDMA, $l_{adjacent\_M}$ adjacent PHICH resources would be available for assignment to up to $l_{adjacent\_M}$ UEs multiplexed together with M-way SDMA. Third, the mirror-mapping rule in equation (11) may distribute M-way SDMA UEs to different PHICH groups and hence different physical PHICH resources, as illustrated below. Fourth, a combination of non-SDMA UEs and SDMA UEs may be flexibly supported in the same subframe with the PHICH resource mapping in equations (9) to (11). The PHICH resource mapping may be more clearly illustrated by the following examples.

Figure 4:
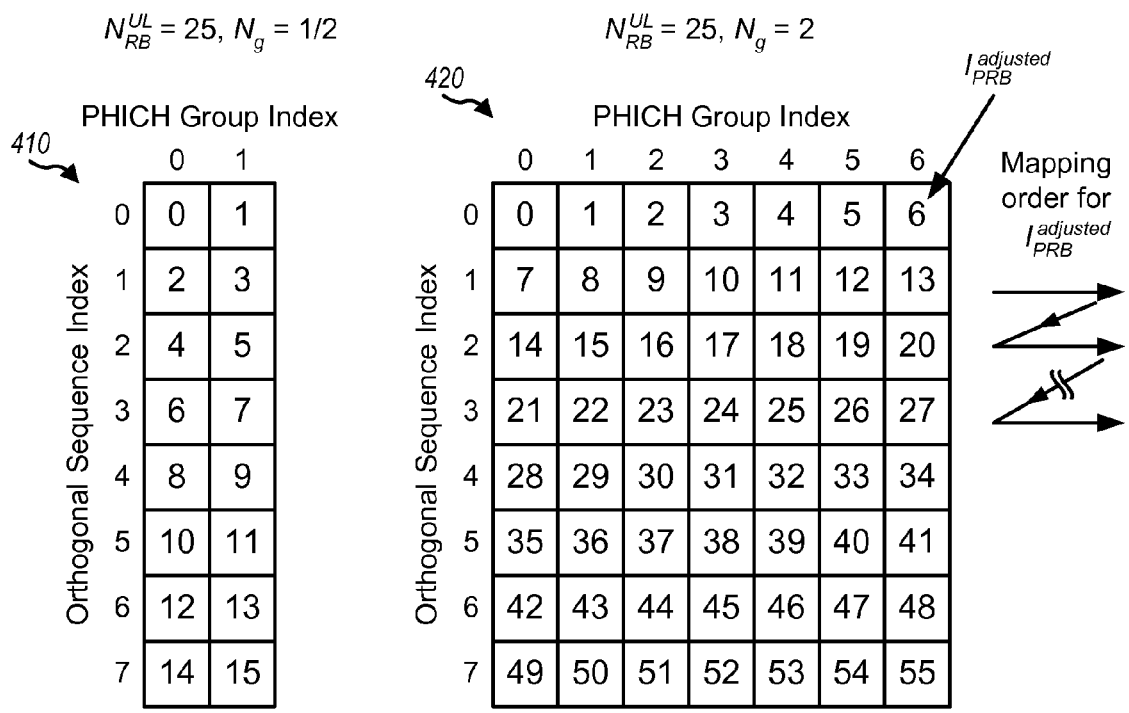
FIG. 4 shows examples of mapping an intermediate index to ACK resources.

FIG. 4 shows two examples of mapping $I_{PRB}^{adjusted}$ values to PHICH resources in accordance with equation set (9). In the first example, $N_{RB}^{UL}=25$, $N_g=\frac{1}{2}$, and the PRBs for the uplink are assigned indices of 0 through 24. In this example, $N_{PHICH}^{group}=2$ from Table 2, and $N_{PHICH}^{seq}=8$ for the normal cyclic prefix. The 16 available PHICH resources are represented by an 8×2 table 410 having (i) two columns for the two PHICH groups with indices of 0 and 1 and (ii) eight rows for the eight orthogonal sequences with indices of 0 through 7. Each PHICH resource has an index of $(n_{PHICH}^{group}, n_{PHICH}^{seq})$, where $n_{PHICH}^{group}$ is the column index and $n_{PHICH}^{seq}$ is the row index. The $I_{PRB}^{adjusted}$ values for the 16 PHICH resources are shown in table 410.

In the second example, $N_{RB}^{UL}=25$ and $N_g=2$. In this example, $N_{PHICH}^{group}=7$ from Table 2, and $N_{PHICH}^{seq}=8$ for the normal cyclic prefix. The 56 available PHICH resources are represented by an 8×7 table 420 having (i) seven columns for the seven PHICH groups with indices of 0 through 6 and (ii) eight rows for the eight orthogonal sequences with indices of 0 through 7. The $I_{PRB}^{adjusted}$ values for the 56 PHICH resources are shown in table 420.

Figure 5:
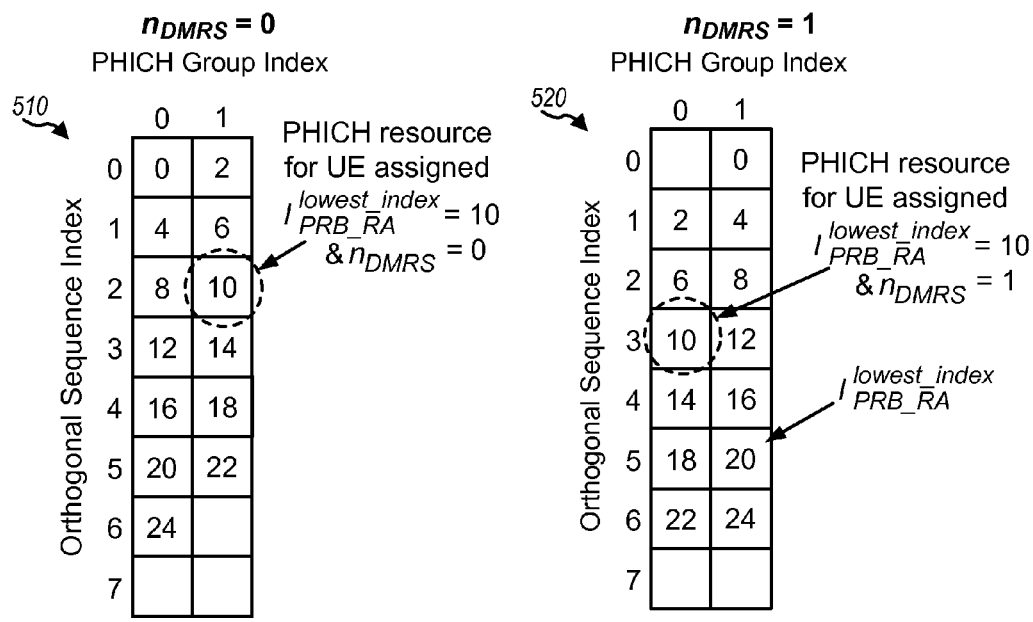
FIG. 5 shows an example of collision-free ACK resource mapping.

FIG. 5 shows an example of the collision-free PHICH resource mapping for the case in which $N_{RB}^{UL}=25$ and $N_g=\frac{1}{2}$. In this example, $N_{PHICH}^{group}=2$, $N_{PHICH}^{seq}=8$, $l_{adjacent\_1}=2$ from Table 4, and equations (9) and (10) are used for the collision-free PHICH resource mapping. A table 510 shows the mapping of lowest PRB indices to PHICH resources for $n_{DMRS}=0$. As shown in table 510, the lowest PRB indices of 0 through 24 (in increments of two for $l_{adjacent\_1}=2$) are mapped to PHICH resources starting with $(n_{PHICH}^{group}, n_{PHICH}^{seq})=(0,0)$ at the upper left corner of the table, scanning across each row from left to right, and moving from the top row toward the bottom row. A table 520 shows the mapping of lowest PRB indices to PHICH resources for $n_{DMRS}=1$. As shown in table 520, the lowest PRB indices of 0 through 24 (in increments of two) are mapped to PHICH resources starting with $(n_{PHICH}^{group}, n_{PHICH}^{seq})=(1,0)$, scanning across each row from left to right, and moving from the top row toward the bottom row. The mapping of lowest PRB indices to PHICH resources for $n_{DMRS}=1$ is shifted by one PHICH resource from the mapping of lowest PRB indices to PHICH resources for $n_{DMRS}=0$. In table 510, PRBs with odd indices 1, 3, 5, etc. may be mapped to the same PHICH resources as PRBs with even indices 0, 2, 4, etc., respectively. A scheduler may be restricted by only the assignment size and not necessarily by the lowest PRB, which may have an even or odd index.

FIG. 6 shows an example of the collision-free PHICH resource mapping for the case in which $N_{RB}^{UL}=25$ and $N_g=2$. In this example, $N_{PHICH}^{group}=7$, $N_{PHICH}^{seq}=8$, $l_{adjacent\_1}=1$ from Table 4, and equations (9) and (11) are used for the PHICH resource mapping. A table 610 shows the mapping of lowest PRB indices to PHICH resources for $n_{DMRS}=0$, which uses the top part of equation (11). As shown in table 610, the lowest PRB indices of 0 through 24 are mapped to PHICH resources starting with $(n_{PHICH}^{group}, n_{PHICH}^{seq})=(0,0)$ at the upper left corner of the table, scanning across each row from left to right, and moving from the top row toward the bottom row. A table 620 shows the mapping of lowest PRB indices to PHICH resources for $n_{DMRS}=1$, which uses the bottom part of equation (11). As shown in table 620, the lowest PRB indices of 0 through 24 are mapped to PHICH resources starting with $(n_{PHICH}^{group}, n_{PHICH}^{seq})=(6,7)$ at the lower right corner of the table, scanning across each row from right to left, and moving from the bottom row toward the top row. The mapping of lowest PRB indices to PHICH resources for $n_{DMRS}=1$ is thus a mirror image of the mapping of lowest PRB indices to PHICH resources for $n_{DMRS}=0$.

A table 630 shows the mapping of lowest PRB indices to PHICH resources for $n_{DMRS}=2$, which uses the top part of equation (11) with an offset of one. As shown in table 630, the lowest PRB indices of 0 through 24 are mapped to PHICH resources starting at $(n_{PHICH}^{group}, n_{PHICH}^{seq})=(1,0)$ and scanning toward the lower right corner. A table 640 shows the mapping of lowest PRB indices to PHICH resources for $n_{DMRS}=3$, which uses the bottom part of equation (11) with an offset of one. As shown in table 640, the lowest PRB indices of 0 through 24 are mapped to PHICH resources starting at $(n_{PHICH}^{group}, n_{PHICH}^{seq})=(5,7)$ and scanning toward the upper left corner.

FIG. 6 shows exemplary mappings of PRBs to PHICH resources based on equation (11). Other PHICH resource mappings based on other equations may also be defined such that different offset values for different $n_{DMRS}$ may be applied. As an example, for $n_{DMRS}=2$, the lowest PRB indices of 0 through 24 may be mapped to PHICH resources starting at $(n_{PHICH}^{group}, n_{PHICH}^{seq})=(0,1)$ in the second row and scanning toward the lower right corner. For $n_{DMRS}=3$, the lowest PRB indices of 0 through 24 may be mapped to PHICH resources starting at $(n_{PHICH}^{group}, n_{PHICH}^{seq})=(6,6)$ in the second to last row and scanning toward the upper left corner.

As shown in FIGS. 5 and 6, a pair of SDMA UEs may often be assigned PHICH resources in two different PHICH groups. For example, in FIG. 6, two SDMA UEs with lowest PRB 0 may be assigned PHICH resources in groups 0 and 6, two SDMA UEs with lowest PRB 1 may be assigned PHICH resources in groups 1 and 5, etc. Mapping a pair of SDMA UEs to different PHICH groups may avoid mutual interference between these SDMA users. Each PHICH group may map to a different set of (e.g., 12) resource elements. The resources for different PHICH groups may be orthogonal and hence may be free of mutual interference. Within a given PHICH group, different UEs may be distinguished via different orthogonal sequences and inphase/quadrature (I/Q) branches. UEs in the same PHICH group may thus be subject to mutual interference depending on channel conditions.

FIGS. 5 and 6 show two examples of the collision-free PHICH resource mapping. The mapping of $I_{PRB\_RA}^{lowest\_index}$ and $n_{DMRS}$ to PHICH resources for other system bandwidths and other $N_g$ values may be performed in similar manner.

Figure 7:
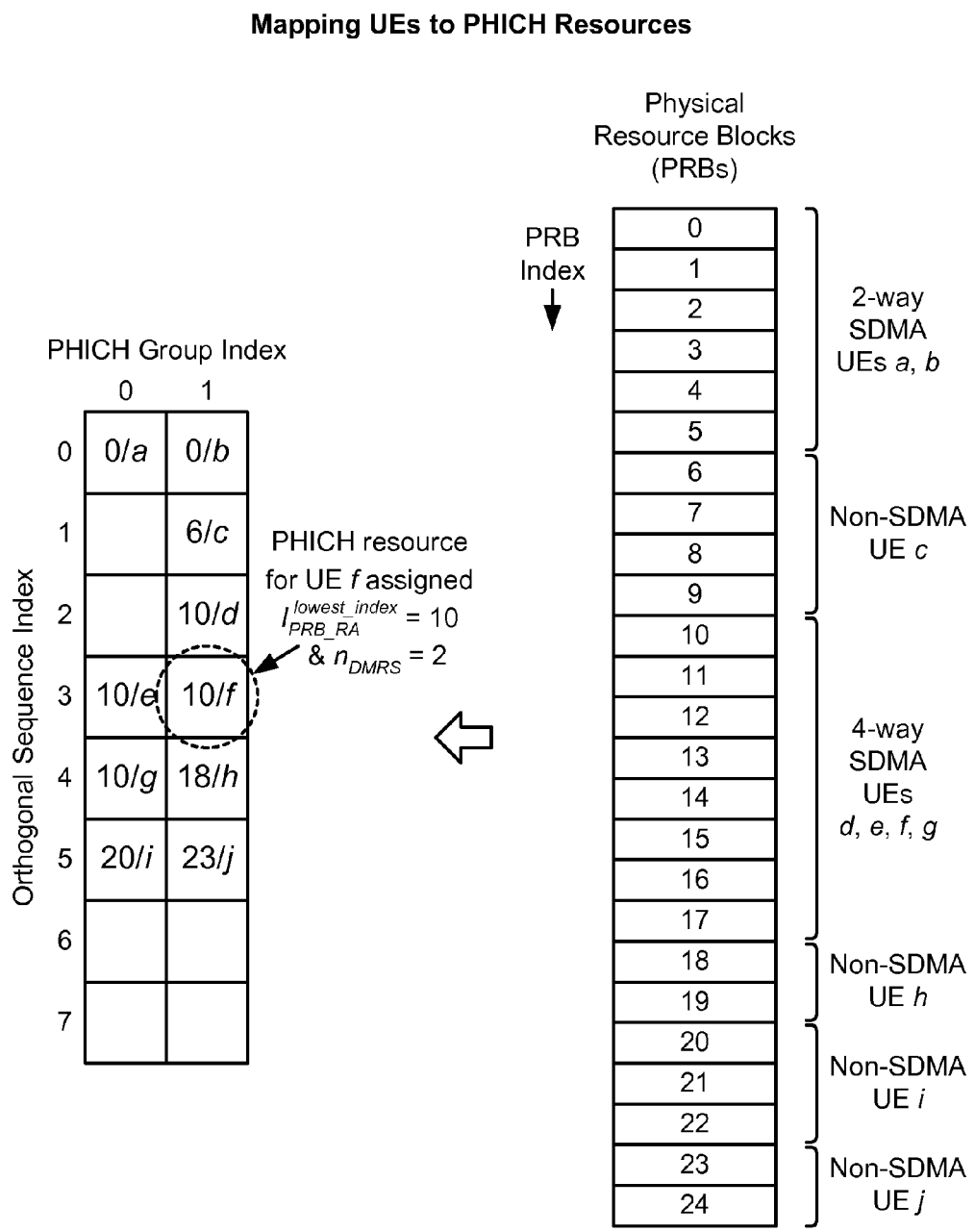
FIG. 7 shows an example of uplink scheduling.

FIG. 7 shows an example of uplink scheduling for the case in which $N_{RB}^{UL}=25$ and $N_g=\frac{1}{2}$. In this example, $l_{adjacent\_1}=2$ and $l_{adjacent\_M}=M \cdot l_{adjacent\_1}$ for M>1 in order to avoid collision. Equations (9) and (10) are used for the PHICH resource mapping.

In the example shown in FIG. 7, two UEs a and b are assigned PRBs 0 to 5 with 2-way SDMA. UE a is assigned an $n_{DMRS}$ value of 0 and is also assigned PHICH resources $(n_{PHICH}^{group}, n_{PHICH}^{seq})=(0,0)$. UE b is assigned an $n_{DMRS}$ value of 1 and is also assigned PHICH resources (1, 0). A non-SDMA UE c is assigned PRBs 6 to 9 and is also assigned PHICH resource (1, 1). Four UEs d, e, f and g are assigned PRBs 10 to 17 with 4-way SDMA, are assigned $n_{DMRS}$ values of 0 to 3, respectively, and are also assigned PHICH resources (1, 2), (0, 3), (1, 3) and (0, 4), respectively. A non-SDMA UE h is assigned PRBs 18 and 19 and is also assigned PHICH resource (1, 4). A non-SDMA UE i is assigned PRBs 20 to 22 and is also assigned PHICH resource (0, 5). A non-SDMA UE j is assigned PRBs 23 and 24 and is also assigned PHICH resource (1, 5).

As shown in FIG. 7, M-way SDMA UEs with the same resource allocation may be mapped to consecutive PHICH resources, which may be available by restricting $l_{adjacent\_M}=M \cdot l_{adjacent\_1}$. Non-SDMA UEs with different resource allocations may be mapped to different PHICH resources. The collision-free PHICH resource mapping can flexibly map both non-SDMA UEs and SDMA UEs to different PHICH resources and avoid collisions.

Figure 8:
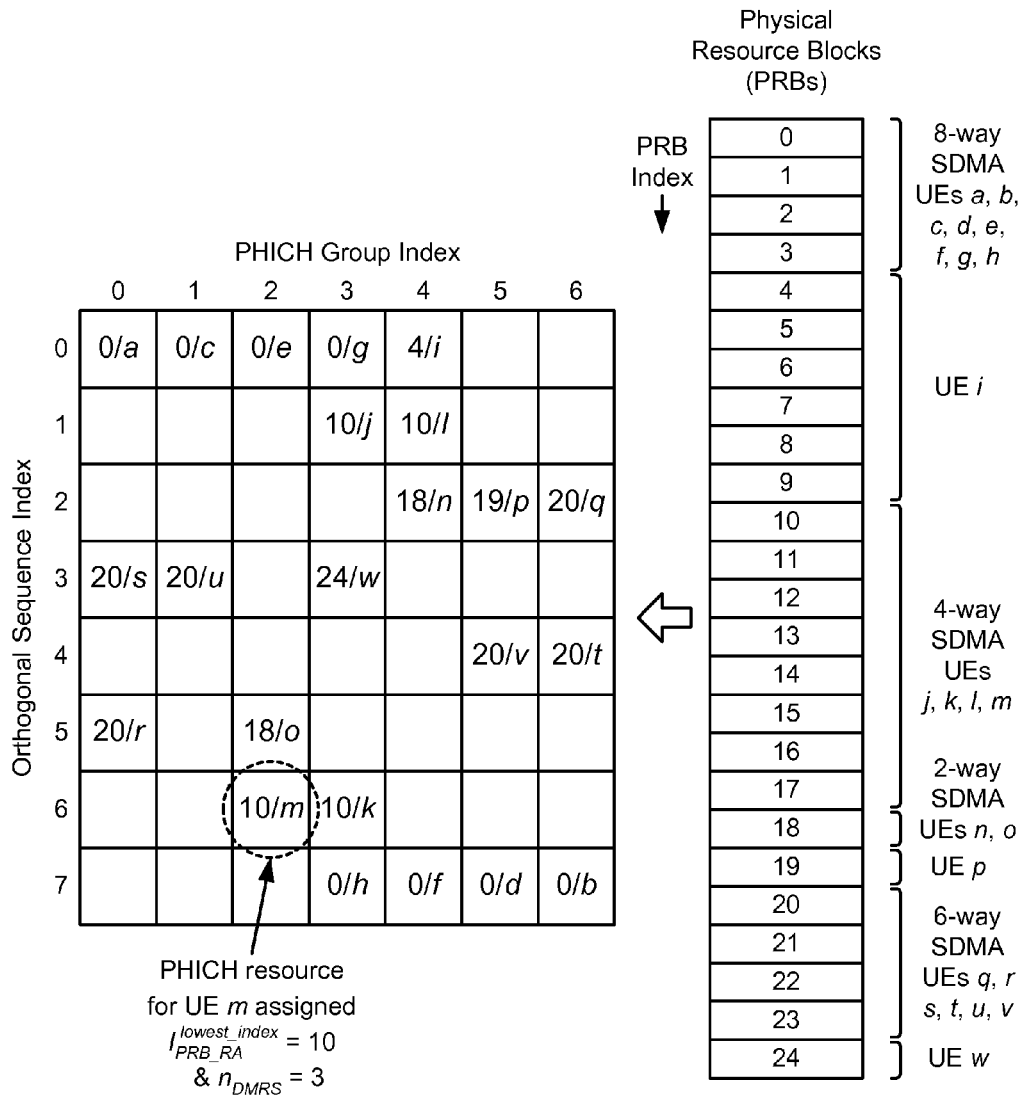
FIG. 8 shows another example of uplink scheduling.

FIG. 8 shows an example of uplink scheduling for the case in which $N_{RB}^{UL}=25$ and $N_g=2$. In this example, $l_{adjacent\_1}=l_{adjacent\_2}=1$ and $l_{adjacent\_M}=\lceil M/2 \rceil$ for M>2 in order to avoid collision. Equations (9) and (11) are used for the PHICH resource mapping.

In the example shown in FIG. 8, eight UEs a to h are assigned PRBs 0 to 3 with 8-way SDMA. UEs a, c, e and g are assigned $n_{DMRS}$ values of 0, 2, 4 and 6, respectively, and are also assigned PHICH resources $(n_{PHICH}^{group}, n_{PHICH}^{seq})=(0, 0), (1, 0), (2, 0)$ and $(3, 0)$, respectively. UEs b, d, f and h are assigned $n_{DMRS}$ values of 1, 3, 5 and 7, respectively, and are also assigned PHICH resources (6, 7), (5, 7), (4, 7) and (3, 7), respectively. A non-SDMA UE i is assigned PRBs 4 to 9 and is also assigned PHICH resource (4, 0). Four UEs j, k, l and m are assigned PRBs 10 to 17 with 4-way SDMA, are assigned $n_{DMRS}$ values of 0, 1, 2 and 3, respectively, and are also assigned PHICH resources (3, 1), (3, 6), (4, 1) and (2, 6), respectively. Two UEs n and o are assigned PRB 18 with 2-way SDMA, are assigned $n_{DMRS}$ values of 0 and 1, respectively, and are also assigned PHICH resources (4, 2) and (2, 5), respectively. A non-SDMA UE p is assigned PRB 19 and is also assigned PHICH resource (5, 2). Six UEs q, r, s, t, u and v are assigned PRBs 20 to 23 with 6-way SDMA, are assigned $n_{DMRS}$ values of 0 to 5, respectively, and are also assigned PHICH resources (6, 2), (0, 5), (0, 3), (6, 4), (1, 3) and (5, 4), respectively. A non-SDMA UE w is assigned PRB 24 and is also assigned PHICH resource (3, 3).

As shown in FIG. 8, the collision-free PHICH resource mapping can flexibly map both non-SDMA UEs and SDMA UEs to different PHICH resources and avoid collisions. For M-way SDMA, UEs that are assigned even $n_{DMRS}$ values are mapped to consecutive PHICH resources with ascending indices (or I branch) whereas UEs that are assigned odd $n_{DMRS}$ values are mapped to consecutive PHICH resources with descending indices (or Q branch).

The collision-free PHICH resource mapping shown in equations (9) to (11) can flexibly map non-SDMA UEs and SDMA UEs to PHICH resources without collisions, as described above. In one design, $n_{DMRS}$ for M-way SDMA may be restricted to a range of 0 to M−1 in order to reduce the input dimensional space. In one design, the minimum resource allocation size $l_{adjacent\_M}$ may also be restricted to ensure no PHICH collisions. The lowest PRB index may be implicitly restricted due to the minimum resource allocation size. For example, if a lowest PRB with index X is allocated to a given UE, then the next lowest PRB that can be allocated is at least X plus $l_{adjacent\_M}$. For a given output dimensional space, $l_{adjacent\_M}$ may be selected to be as small as possible to provide the most flexibility to the scheduler while ensuring collision-free mapping. In another design, the lowest PRB index may be explicitly limited. For example, the lowest PRBs may be restricted to PRBs with even indices. The assignment size may then be implicitly restricted, e.g., to at least two PRBs if the lowest PRBs are restricted to even indices. In general, $n_{DMRS}$, the minimum resource allocation size $l_{adjacent\_M}$, the lowest PRB, or any combination thereof may be restricted to achieve collision-free or low-collision PHICH resource mapping. The collision-free PHICH resource mapping may greatly simplify the scheduler for the uplink.

In one design, DMRS cyclic shifts may be defined to provide good performance. $n_{DMRS}$ may be restricted to be within a range of 0 to M−1 for M-way SDMA, as described above. The cyclic shift α may be derived from $n_{DMRS}$, e.g., as shown in equation (2) and Table 1. However, when $n_{DMRS}$ is restricted to a range of 0 to M−1, the distance or separation between assigned cyclic shifts may be low for few SDMA UEs, which may degrade performance.

Table 5 shows exemplary mapping of $n_{DMRS}$ to cyclic shift α, which can provide larger distance betweens cyclic shifts assigned to few SDMA UEs. For example, two UEs with 2-way SDMA may be assigned $n_{DMRS}$ values of 0 and 1, which may be mapped to cyclic shift values of 0 and 7 having the largest possible distance. Four UEs with 4-way SDMA may be assigned $n_{DMRS}$ values of 0, 1, 2 and 3, which may be mapped to cyclic shift values of 0, π, π/2 and 3π/2 having the largest possible distance. The mapping in Table 5 provides the maximum distance of $2\pi/2^B$ for $n_{DMRS}$ values of 0 through $2^B-1$, where B≧1. The mapping in Table 5 may improve performance.

TABLE 5

Cyclic shifts with greater separation

| $n_{DMRS}$ | Cyclic shift index | α |
|---|---|---|
| 0 | 0 | 0 |
| 1 | 4 | π |
| 2 | 2 | π/2 |
| 3 | 6 | 3π/2 |
| 4 | 1 | π/4 |
| 5 | 5 | 5π/4 |
| 6 | 3 | 3π/4 |
| 7 | 7 | 7π/4 |

The system may support dynamic scheduling and semi-persistent scheduling. For dynamic scheduling, an uplink grant may be sent for each scheduled PUSCH transmission, as shown in FIG. 3. $I_{PRB\_RA}^{lowest\_index}$ index and $n_{DMRS}$ may be sent in the uplink grant and may be used by a UE to determine its assigned PHICH resource, as described above. For semi-persistent scheduling, an uplink grant may be sent for the first PUSCH transmission and may be used for subsequent PUSCH transmissions. In one design, $I_{PRB\_RA}^{lowest\_index}$ and $n_{DMRS}$ sent in the uplink grant may be used to determine the PHICH resource for first PUSCH transmission as well as subsequent PUSCH transmissions. In another design, a default value (e.g., 0) may be used for $n_{DMRS}$. The default value may also be used for other PUSCH transmissions without an uplink grant.

The techniques described herein may also be used for multi-carrier operation. A carrier may have a specific center frequency and a specific bandwidth and may be used to send data, control information, reference signal, etc. For example, one carrier may be available for the downlink, and multiple ($N_{carrier}$) carriers may be available for the uplink and may be assigned indices of $n_{carrier}$ from 0 to $N_{carrier}-1$. The $N_{carrier}$ uplink carriers may be mapped to the single downlink carrier. The available PRBs on the uplink may be mapped to PHICH resources on the downlink. In one design, an effective $N_g$, $N_{g,eff}$, may be computed for the $N_{carrier}$ uplink carriers as $N_{g,eff}=N_g/N_{carrier}$. The available PHICH resources may then be divided and assigned to the $N_{carrier}$ uplink carriers. The PRBs for each uplink carrier may be mapped to PHICH resources based on $N_{g,eff}$, instead of the actual $N_g$, as described above. In another design, $l_{adjacent\_M}$ may be defined based on M for M-way SDMA as well as $N_{carrier}$ for the number of carriers. Different PHICH resources may be assigned for different combinations of values for $n_{DMRS}$ and $n_{carrier}$.

The techniques described herein may also be used for asymmetric time division duplexing (TDD). In each radio frame, U subframes may be allocated for the downlink, and V subframes may be allocated for the uplink, where V may be greater than U. The available PRBs on the uplink may be mapped to PHICH resources on the downlink. For example, every Q uplink subframes may be assigned indices of $n_{sf}$ from 0 to Q−1, where Q=⌈V/U⌉. Different PHICH resources may be assigned for different combinations of values for $n_{DMRS}$ and $n_{sf}$.

In general, the techniques described herein may be used whenever the input dimensional space for a set of inputs to a mapping function is larger than the output dimensional space for a set of outputs of the mapping function. The set of inputs may comprise $I_{PRB\_RA}^{lowest\_index}$, $n_{DMRS}$, and/or other parameters. One or more inputs may be restricted to ensure collision-free mapping of the inputs to the outputs.

FIG. 9 shows a design of a process 900 for determining ACK resource for a UE. Process 900 may be performed by the UE, an eNB, or some other entity. A first parameter indicative of radio resources allocated to the UE for data transmission may be obtained (block 912). In one design, the first parameter may comprise the lowest index (e.g., $I_{PRB\_RA}^{lowest\_index}$) of at least one PRB allocated to the UE for data transmission. The first parameter may also comprise other information for the radio resources allocated to the UE.

A second parameter indicative of another resource assigned to the UE for data transmission may also be obtained (block 914). At least one of the first and second parameters may be restricted, and each restricted parameter may be limited to a set of allowed values among all available values for the parameter. The first parameter may have no restriction, or may be explicitly restricted to specific values (e.g., even indices), or may be implicitly restricted (e.g., by specifying a minimum allocation size). The set of allowed values may be selected to avoid collisions in mapping the first and second parameters to the available ACK resources. In one design, the second parameter may comprise a cyclic shift (e.g., $n_{DMRS}$) of a reference signal sequence assigned to the UE for data transmission. The set of allowed values for the second parameter may include values within a range of 0 to M−1 for M-way SDMA, where M may be one or greater. M different cyclic shifts of the reference signal sequence may be associated with M allowed values for the second parameter. These M cyclic shifts may have distance or separation that is dependent on M, e.g., as shown in Table 5. In another design, the second parameter may comprise an index of a carrier (e.g., $n_{carrier}$) assigned to the UE for data transmission. In yet another design, the second parameter may comprise an index of a subframe (e.g., $n_{sf}$) assigned to the UE for data transmission. The second parameter may also comprise other information for other resources assigned to the UE.

ACK resource assigned to the UE for data transmission may be determined based on the first and second parameters (block 916). In one design, the ACK resource may comprise an index of an orthogonal sequence for the PHICH and an index of a PHICH group. In other designs, the ACK resource may comprise other types of resources that may be used to send ACK information.

In one design, sequential values of the first parameter may be mapped to sequential indices of the available ACK resources, and each allowed value of the second parameter may be associated with a different starting ACK resource index, e.g., as shown in equation (10) or (12) and tables 520 and 530 in FIG. 5. In another design, different mapping directions may be used for different allowed values of the second parameter. For a first allowed value of the second parameter (e.g., $n_{DMRS}=0$), sequentially increasing values of the first parameter may be mapped to sequentially increasing indices of the available ACK resources, starting with the smallest ACK resource index, e.g., as shown in equation (11) or (13) and table 610 in FIG. 6. For a second allowed value of the second parameter (e.g., $n_{DMRS}=1$), sequentially increasing values of the first parameter may be mapped to sequentially decreasing indices of the available ACK resources, starting with the largest ACK resource index, e.g., as shown in equation (11) or (13) and table 620 in FIG. 6. The first parameter values may also be mapped to the available ACK resources in other manners, and the second parameter values may also control the mapping in other manners.

In one design of block 916, a third parameter indicative of a minimum amount of radio resources (e.g., $1_{adjacent\_M}$) to allocate to the UE may be obtained. The third parameter may be determined based on (i) a fourth parameter indicative of the amount of available ACK resources (e.g., $N_g$), (ii) a fifth parameter indicative of the amount of available radio resources (e.g., $N_{RB}^{UL}$), (iii) a parameter M for M-way SDMA, where M may be one or greater, and/or (iv) some other parameter such as the number of carriers. For example, the third parameter may be determined as $1_{adjacent\_M}=M \cdot 1_{adjacent\_1}$ or $1_{adjacent\_M}=\lceil M/2 \rceil$, where $1_{adjacent\_1}$ may be dependent on the third and fourth parameters, e.g., as shown in Table 4. The third parameter may also be set to a predetermined value (e.g., 1) if a sufficient amount of ACK resources is available. The third parameter may be selected to avoid collisions in mapping the first and second parameters to the available ACK resources. In any case, the ACK resource may be determined based further on the third parameter.

In one design, an intermediate index (e.g., $1_{PRB\_RA}^{adjusted}$) may be determined based on the first and second parameters, e.g., as shown in equation (10) or (12). In another design, the intermediate index may be determined based on the first, second and third parameters, e.g., as shown in equation (11) or (13). For both designs, the intermediate index may be mapped to an index of the ACK resource assigned to the UE based on a predetermined mapping, e.g., as shown in equation set (9).

Data may be exchanged on the radio resources allocated to the UE (block 918). ACK information for the data may be exchanged on the ACK resource assigned to the UE (block 920). For data transmission on the uplink, data may be sent on the allocated radio resources by the UE and received by the eNB. The ACK information may be sent on the ACK resource by the eNB and received by the UE. For data transmission on the downlink, data may be sent on the allocated radio resources by the eNB and received by the UE. The ACK information may be sent on the ACK resource by the UE and received by the eNB.

FIG. 10 shows a design of an apparatus 1000 for determining ACK resource for a UE. Apparatus 1000 includes a module 1012 to obtain a first parameter indicative of radio resources allocated to the UE for data transmission, a module 1014 to obtain a second parameter indicative of another resource assigned to the UE for data transmission, with at least one of the first and second parameters being restricted, and each restricted parameter being limited to a set of allowed values among all available values for the parameter, a module 1016 to determine ACK resource assigned to the UE for data transmission based on the first and second parameters, a module 1018 to exchange (e.g., send or receive) data on the radio resources allocated to the UE, and a module 1020 to exchange (e.g., receive or send) ACK information for the data on the ACK resource assigned to the UE.

The modules in FIG. 10 may comprise processors, electronics devices, hardware devices, electronics components, logical circuits, memories, software codes, firmware codes, etc., or any combination thereof.

Figure 11:
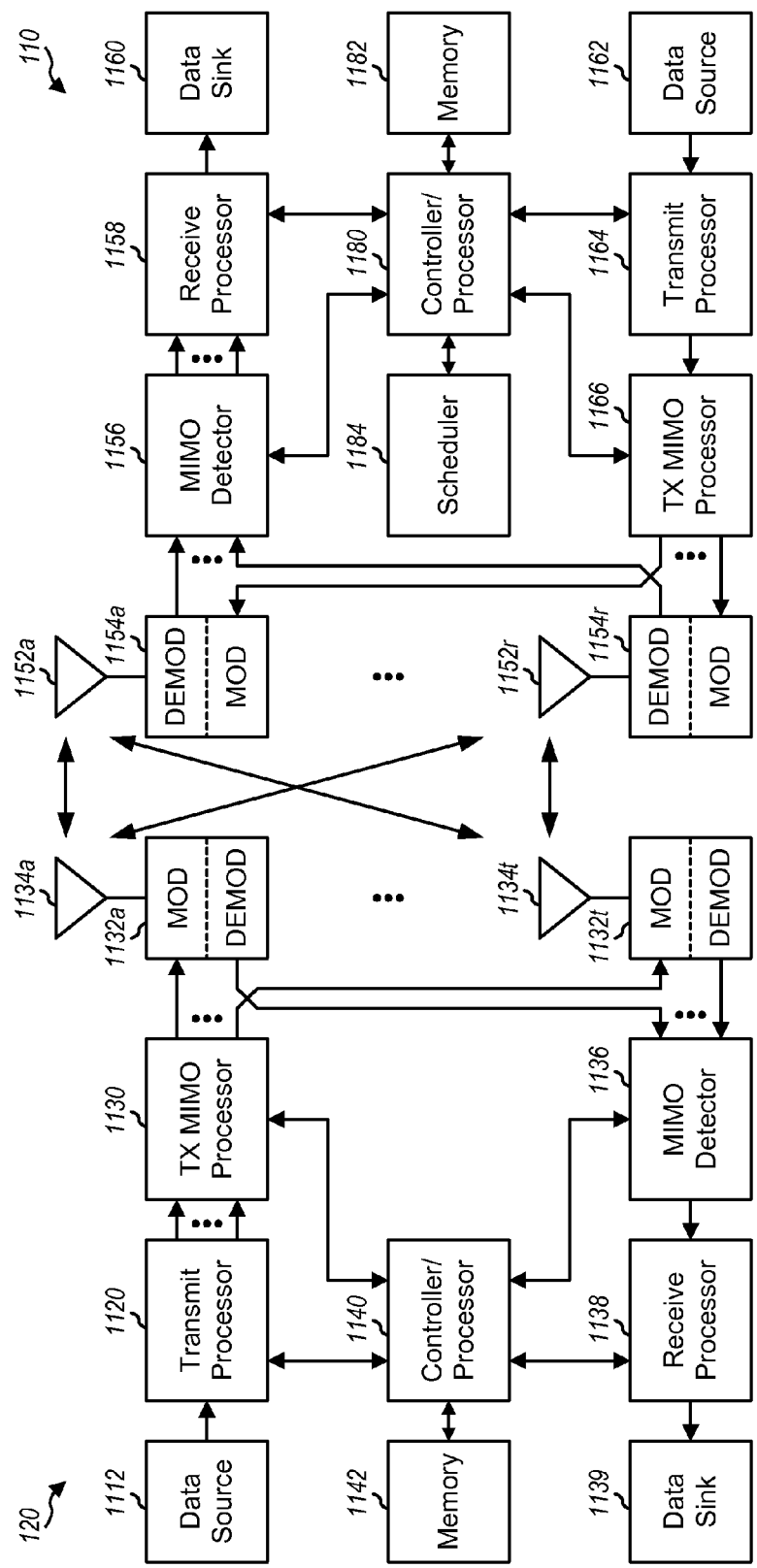
FIG. 11 shows a block diagram of a base station and a UE.

FIG. 11 shows a block diagram of a design of a base station/eNB 110 and a UE 120, which may be one of the eNBs and one of the UEs in FIG. 1. UE 120 may be equipped with T antennas 1134a through 1134t, and eNB 110 may be equipped with R antennas 1152a through 1152r, where in general $T \geq 1$ and $R \geq 1$.

At UE 120, a transmit processor 1120 may receive data from a data source 1112, process (e.g., encode, interleave, and modulate) the data based on one or more modulation and coding schemes, and provide data symbols. Transmit processor 1120 may also process control information (e.g., for resource requests) from a controller/processor 1140 and provide control symbols. Transmit processor 1120 may also generate reference signal symbols for a demodulation reference signal based on a cyclic shift assigned to UE 120. A transmit (TX) multiple-input multiple-output (MIMO) processor 1130 may multiplex the data symbols, the control symbols, and/or the reference signal symbols. TX MIMO processor 1130 may perform spatial processing (e.g., precoding) on the multiplexed symbols, if applicable, and provide T output symbol streams to T modulators (MODs) 1132a through 1132t. Each modulator 1132 may process a respective output symbol stream (e.g., for SC-FDM) to obtain an output sample stream. Each modulator 1132 may further process (e.g., convert to analog, amplify, filter, and upconvert) the output sample stream to obtain an uplink signal. T uplink signals from modulators 1132a through 1132t may be transmitted via T antennas 1134a through 1134t, respectively.

At eNB 110, antennas 1152a through 1152r may receive the uplink signals from UE 120 and provide received signals to demodulators (DEMODs) 1154a through 1154r, respectively. Each demodulator 1154 may condition (e.g., filter, amplify, downconvert, and digitize) a respective received signal to obtain input samples. Each demodulator 1154 may further process the input samples (e.g., for SC-FDM) to obtain received symbols. A MIMO detector 1156 may obtain received symbols from all R demodulators 1154a through 1154r, perform MIMO detection on the received symbols if applicable, and provide detected symbols. A receive processor 1158 may process (e.g., demodulate, deinterleave, and decode) the detected symbols, provide decoded data to a data sink 1160, and provide decoded control information to a controller/processor 1180.

On the downlink, at eNB 110, data from a data source 1162 and control information (e.g., for uplink grants, ACK information, etc.) from controller/processor 1180 may be processed by a transmit processor 1164, precoded by a TX MIMO processor 1166 if applicable, conditioned by modulators 1154a through 1154r, and transmitted to UE 120. At UE 120, the downlink signals from eNB 110 may be received by antennas 1134, conditioned by demodulators 1132, processed by a MIMO detector 1136 if applicable, and further processed by a receive processor 1138 to obtain the data and control information sent to UE 120.

Controllers/processors 1140 and 1180 may direct the operation at UE 120 and eNB 110, respectively. Processor 1140 and/or other processors and modules at UE 120 may perform or direct process 900 in FIG. 9 and/or other processes for the techniques described herein. Processor 1180 and/or other processors and modules at eNB 110 may also perform or direct process 900 in FIG. 9 and/or other processes for the techniques described herein. Memories 1142 and 1182 may store data and program codes for UE 120 and eNB 110, respectively. A scheduler 1184 may schedule UEs for downlink and/or uplink transmission and may provide allocations of resources (e.g., PRBs, cyclic shifts, ACK resources, etc.) for the scheduled UEs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   obtaining, by a wireless communication device, a first parameter indicative of radio resources allocated to a user equipment (UE) for data transmission;
   obtaining, by the wireless communication device, a second parameter indicative of another resource assigned to the UE for data transmission, wherein at least one of the first and second parameters is restricted, and each restricted parameter is limited to a set of allowed values among all available values for the parameter;
   determining, by the wireless communication device, a third parameter indicative of a minimum amount of radio resources to allocate to the UE; and
   determining, by the wireless communication device, acknowledgement (ACK) resource assigned to the UE for data transmission based on the first, second, and third parameters,
   wherein the determining the third parameter comprises
      obtaining a fourth parameter indicative of amount of available ACK resources,
      obtaining a fifth parameter indicative of amount of available radio resources, and
      determining the third parameter based on the fourth and fifth parameters.

2. The method of claim 1, wherein the first parameter comprises a lowest index of at least one physical resource block (PRB) allocated to the UE for data transmission.

3. The method of claim 1, wherein the second parameter comprises a cyclic shift of a reference signal sequence assigned to the UE for data transmission.

4. The method of claim 3, wherein the set of allowed values for the second parameter comprises values within a range of 0 to M−1 for M-way spatial division multiple access (SDMA), where M is one or greater.

5. The method of claim 4, wherein M different cyclic shifts of the reference signal sequence are associated with M allowed values for the second parameter, and wherein distance between the M cyclic shifts is dependent on M.

6. The method of claim 1, wherein sequential values of the first parameter are mapped to sequential indices of available ACK resources, and wherein each allowed value of the second parameter is associated with a different starting ACK resource index.

7. The method of claim 1, wherein for a first allowed value of the second parameter, sequentially increasing values of the first parameter are mapped to sequentially increasing indices of available ACK resources, starting with a smallest ACK resource index, and wherein for a second allowed value of the second parameter, sequentially increasing values of the first parameter are mapped to sequentially decreasing indices of the available ACK resources, starting with a largest ACK resource index.

8. The method of claim 1, wherein the third parameter is determined based further on M for M-way spatial division multiple access (SDMA), where M is one or greater.

9. The method of claim 1, wherein the determining the third parameter comprises determining the third parameter based on number of uplink carriers mapped to a downlink carrier.

10. The method of claim 1, wherein the determining the ACK resource comprises
determining an intermediate index based on the first, second and third parameters, and
mapping the intermediate index to an index of the ACK resource assigned to the UE based on a predetermined mapping.

11. The method of claim 10, wherein the intermediate index is determined in accordance with $$I_{PRB}^{adjusted} = \lfloor I_{PRB\_RA}^{lowest\_index} / l_{adjacent\_1} \rfloor + I_{offset},$$

where $I_{PRB\_RA}^{lowest\_index}$ is the first parameter,
$I_{offset}$ is an offset determined based on the second parameter,
$l_{adjacent\_1}$ is the third parameter for non-SDMA, and
$I_{PRB}^{adjusted}$ is the intermediate index.

12. The method of claim 1, wherein the third parameter is selected to avoid collisions in mapping the first and second parameters to available ACK resources.

13. The method of claim 1, wherein the set of allowed values for the second parameter is selected to avoid collisions in mapping the first and second parameters to available ACK resources.

14. The method of claim 1, further comprising:
sending data on the radio resources allocated to the UE; and
receiving ACK information for the data on the ACK resource assigned to the UE.

15. The method of claim 1, further comprising:
receiving data on the radio resources allocated to the UE; and
sending ACK information for the data on the ACK resource assigned to the UE.

16. The method of claim 1, wherein the ACK resource comprises an index of an orthogonal sequence for a physical HARQ indicator channel (PHICH) and an index of a PHICH group.

17. An apparatus for wireless communication, comprising:
means for obtaining a first parameter indicative of radio resources allocated to a user equipment (UE) for data transmission;
means for obtaining a second parameter indicative of another resource assigned to the UE for data transmission, wherein at least one of the first and second parameters is restricted, and each restricted parameter is limited to a set of allowed values among all available values for the parameter;
means for determining a third parameter indicative of a minimum amount of radio resources to allocate to the UE; and
means for determining acknowledgement (ACK) resource assigned to the UE for data transmission based on the first, second, and third parameter,
wherein the means for determining the third parameter comprises
means for obtaining a fourth parameter indicative of amount of available ACK resources,
means for obtaining a fifth parameter indicative of amount of available radio resources, and
means for determining the third parameter based on the fourth and fifth parameters.

18. The apparatus of claim 17, wherein the first parameter comprises a lowest index of at least one physical resource block (PRB) allocated to the UE for data transmission.

19. The apparatus of claim 17, wherein the second parameter comprises a cyclic shift of a reference signal sequence assigned to the UE for data transmission, and wherein the set of allowed values for the second parameter comprises values within a range of 0 to M−1 for M-way spatial division multiple access (SDMA), where M is one or greater.

20. The apparatus of claim 17, wherein sequential values of the first parameter are mapped to sequential indices of available ACK resources, and wherein each allowed value of the second parameter is associated with a different starting ACK resource index.

21. The apparatus of claim 17, wherein for a first allowed value of the second parameter, sequentially increasing values of the first parameter are mapped to sequentially increasing indices of available ACK resources, starting with a smallest ACK resource index, and wherein for a second allowed value of the second parameter, sequentially increasing values of the first parameter are mapped to sequentially decreasing indices of the available ACK resources, starting with a largest ACK resource index.

22. An apparatus for wireless communication, comprising:
at least one processor configured to obtain a first parameter indicative of radio resources allocated to a user equipment (UE) for data transmission, to obtain a second parameter indicative of another resource assigned to the UE for data transmission, wherein at least one of the first and second parameters is restricted, and each restricted parameter is limited to a set of allowed values among all available values for the parameter, to determine a third parameter indicative of a minimum amount of radio resources to allocate to the UE, and to determine acknowledgement (ACK) resource assigned to the UE for data transmission based on the first, second, and third parameters,
wherein the at least one processor is configured to obtain a fourth parameter indicative of amount of available ACK resources, to obtain a fifth parameter indicative of amount of available radio resources, and to determine the third parameter based on the fourth and fifth parameters.

23. The apparatus of claim 22, wherein the first parameter comprises a lowest index of at least one physical resource block (PRB) allocated to the UE for data transmission.

24. The apparatus of claim 22, wherein the second parameter comprises a cyclic shift of a reference signal sequence assigned to the UE for data transmission, and wherein the set of allowed values for the second parameter comprises values within a range of 0 to M−1 for M-way spatial division multiple access (SDMA), where M is one or greater.

25. The apparatus of claim 22, wherein sequential values of the first parameter are mapped to sequential indices of available ACK resources, and wherein each allowed value of the second parameter is associated with a different starting ACK resource index.

26. The apparatus of claim 22, wherein for a first allowed value of the second parameter, sequentially increasing values of the first parameter are mapped to sequentially increasing indices of available ACK resources, starting with a smallest ACK resource index, and wherein for a second allowed value of the second parameter, sequentially increasing values of the first parameter are mapped to sequentially decreasing indices of the available ACK resources, starting with a largest ACK resource index.

27. A computer program product, comprising:
a non-transitory computer-readable medium comprising:
code for causing at least one computer to obtain a first parameter indicative of radio resources allocated to a user equipment (UE) for data transmission,
code for causing the at least one computer to obtain a second parameter indicative of another resource assigned to the UE for data transmission, wherein at least one of the first and second parameters is restricted, and each restricted parameter is limited to a set of allowed values among all available values for the parameter,
code for causing the at least one computer to determine a third parameter indicative of a minimum amount of radio resources to allocate to the UE, and
code for causing the at least one computer to determine acknowledgement (ACK) resource assigned to the UE for data transmission based on the first, second, and third parameters,
wherein the code for causing at least one computer to determine the third parameter comprises
code for causing the at least one computer to obtain a fourth parameter indicative of amount of available ACK resources,
code for causing the at least one computer to obtain a fifth parameter indicative of amount of available radio resources, and
code for causing the at least one computer to determine the third parameter based on the fourth and fifth parameters.

28. A method for wireless communication performed by a device, comprising:
obtaining a first parameter indicative of radio resources allocated to a user equipment (UE) for data transmission;
obtaining a second parameter indicative of another resource assigned to the UE for data transmission, wherein at least one of the first and second parameters is restricted, and each restricted parameter is limited to a set of allowed values among all available values for the parameter; and
determining acknowledgement (ACK) resource assigned to the UE for data transmission based on the first and second, and a third parameters,
wherein the determining the ACK resource comprises:
determining an intermediate index based on the first and second parameters, and
mapping the intermediate index to an index of the ACK resource assigned to the UE based on a predetermined mapping.

29. The method of claim 28, wherein the intermediate index is determined in accordance with $$I_{PRB}^{adjusted} = \begin{cases} I_{PRB\_RA}^{lowest\_index} + I_{offset} & \text{for a first set of } n_{DMRS} \text{ values} \\ I_{max} - I_{PRB\_RA}^{lowest\_index} - I_{offset} & \text{for a second set of } n_{DMRS} \text{ values} \end{cases}$$

where $I_{PRB\_RA}^{lowest\_index}$ is the first parameter,
$n_{DMRS}$ is the second parameter,
$I_{offset}$ is an offset determined based on the second parameter,
$I_{max}$ is a largest ACK resource index, and
$I_{PRB}^{adjusted}$ is the intermediate index.

* * * * *